United States Patent
Blunt et al.

(10) Patent No.: US 7,286,079 B2
(45) Date of Patent: Oct. 23, 2007

(54) METHOD AND APPARATUS FOR DETECTING SLOW-MOVING TARGETS IN HIGH-RESOLUTION SEA CLUTTER

(75) Inventors: Shannon D. Blunt, Alexandria, VA (US); Karl R. Gerlach, Chesapeake Beach, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 208 days.

(21) Appl. No.: 11/110,737

(22) Filed: Apr. 21, 2005

(65) Prior Publication Data
US 2006/0238412 A1 Oct. 26, 2006

(51) Int. Cl.
  G01S 7/292 (2006.01)
  G01S 13/52 (2006.01)
  G01S 13/534 (2006.01)
(52) U.S. Cl. .............. 342/159; 342/195; 342/162; 342/93
(58) Field of Classification Search ........ 342/160, 342/159
See application file for complete search history.

(56) References Cited

U.S. PATENT DOCUMENTS

| | | | |
|---|---|---|---|
| 4,119,966 A * | 10/1978 | Bouvier et al. | 342/90 |
| 6,809,682 B1 * | 10/2004 | Madewell | 342/160 |
| 6,937,185 B1 * | 8/2005 | Collazo et al. | 342/159 |
| 7,154,433 B1 * | 12/2006 | Madewell | 342/160 |
| 2004/0046689 A1 * | 3/2004 | Rees et al. | 342/159 |
| 2005/0264438 A1 * | 12/2005 | Fullerton et al. | 342/28 |
| 2006/0049978 A1 * | 3/2006 | Siegel | 342/159 |
| 2006/0132354 A1 * | 6/2006 | Beard et al. | 342/160 |
| 2006/0181451 A1 * | 8/2006 | Samson, Jr. | 342/160 |
| 2006/0238411 A1 * | 10/2006 | Fullerton et al. | 342/147 |

OTHER PUBLICATIONS

Blunt et al. "Non-Coherent Detection of Slow-Moving Targets in High-Resolution Sea Clutter". Proceedings of the IEEE Radar Conference, 2004. Apr. 26-29, 2004, pp. 345-348.*

(Continued)

*Primary Examiner*—Thomas H. Tarcza
*Assistant Examiner*—Matthew M Barker
(74) *Attorney, Agent, or Firm*—John L. Karasek; L. George Legg

(57) ABSTRACT

An apparatus for non-coherently detecting slow-moving targets in high resolution sea clutter includes a binary detector for converting high resolution radar returns, produced in response to a radar pulse scan of a plurality of identical pulses, into corresponding binary outputs based on a comparison of range cell magnitudes with a detector threshold. A range extent filter converts these binary outputs into an output indicating the presence or absence of a cluster of the returns that are closely spaced in range, while a third, persistence integration stage determines target range extent persistence over a predetermined time period. A detector stage declares detection of a target based on a comparison of the output of the third stage with a selected threshold.

20 Claims, 2 Drawing Sheets

OTHER PUBLICATIONS

J. Ward, "Space-time adaptive processing for airborne radar," MIT Lincoln Lab Technical Report ESC-TR-94-109, Dec. 1994 (179 pages).

B.D. Carlson, E.D. Evans, and S.L. Wilson, "Search radar detection and track with the Hough transform, Part I: System Concept," *IEEE Trans*. AES, vol. 30, No. 1, pp. 102-108, Jan. 1994.

B.D. Carlson, E.D. Evans, and S.L. Wilson, "Search radar detection and track with the Hough transform, Part II: detection statistics." *IEEE Trans*. AES, vol. 30, No. 1, pp. 109-115, Jan. 1994.

B.D. Carlson, E.D. Evans, and S.L. Wilson, "Search radar detection and track with the Hough transform, Part III: detection performance with binary integration," *IEEE Trans*. AES, vol. 30, No. 1, pp. 116-125, Jan. 1994).

\* cited by examiner

METHOD AND APPARATUS FOR DETECTING SLOW-MOVING TARGETS IN HIGH-RESOLUTION SEA CLUTTER

FIELD OF THE INVENTION

This invention provides a method and apparatus for non-coherently detecting slow-moving targets in the presence of clutter and, in particular, for detecting slow-moving sea targets in the presence of sea clutter.

BACKGROUND OF THE INVENTION

The radar detection of targets in the presence of sea clutter has historically relied heavily upon the radial velocity of targets with respect to the radar platform. This detection is generally done in one of two ways. Specifically, it is done by estimating the relative target Dopplers (such as for STAP) (see J. Ward, "Space-time adaptive processing for airborne radar," *MIT Lincoln Laboratory Technical Report ESC-TR-94-109*, December 1994). Further, it is also done by examining the path that a target traverses from scan to scan, otherwise known as the "track-before-detect" or "track-to-detect" approach (see B. D. Carlson, E. D. Evans, and S. L. Wilson, "Search radar detection and track with the Hough transform, Part I: System Concept," *IEEE Trans*. AES, Vol. 30, no. 1, pp. 102-108, Jan. 1994; B. D. Carlson, E. D. Evans, and S. L. Wilson, "Search radar detection and track with the Hough transform, Part II: detection statistics," *IEEE Trans*. AES, Vol. 30, no. 1, pp. 109-115, January 1994; and B. D. Carlson, E. D. Evans, and S. L. Wilson, "Search radar detection and track with the Hough transform, Part IIII: detection performance with binary integration," *IEEE Trans*. AES, Vol. 30, no. 1, pp. 116-125, January 1994).

While these approaches can be quite effective in some situations, for targets with little to no radial velocity component, it is quite difficult to differentiate actual targets from the surrounding sea clutter. The reason for this is that a target with low radial velocity with respect to the radar platform has a Doppler frequency close to zero and hence is difficult to distinguish from the background sea clutter. Further, from scan to scan, the target does not appear to be moving so that conventional track-to-detect approaches do no work well either.

SUMMARY OF THE INVENTION

Generally speaking, the present invention concerns a method and apparatus for non-coherently detecting slow-moving sea targets in the presence of sea clutter using a high-resolution radar, by employing target persistence over a number (e.g., several) radar pulses, as well as the target extent information that results from using high-resolution radar. As described in more detail below, the method and apparatus of the invention overcome the problems associated with the methods described above so as to provide effective detection of slow moving targets despite the presence of sea clutter.

In accordance with a first aspect of the invention, there is provided an apparatus for detecting slow-moving targets in high resolution clutter, the apparatus comprising:

a binary detector for converting high resolution returns produced and processed in response to a pulse scan of a plurality of identical pulses, by a plurality of range cells, into corresponding binary outputs based on a comparison of range cell magnitudes with a binary detector threshold;

a range extent filter for converting the binary outputs into a target range extent output indicating presence of a cluster of said high resolution returns that are closely spaced in range;

a persistence integration stage for receiving the output of said range extent filter, for determining target range extent persistence over a predetermined time period, and for producing a persistence output; and a further detector for receiving the persistence output of said persistence integration stage and for declaring detection of a target based on a comparison of the persistence output with a predetermined threshold.

As indicated above, the apparatus is preferably used to detect slow moving targets in high resolution sea clutter and in this application, the detector threshold of said binary detector is related to a quiescent sea level. In one embodiment, the detector threshold is variable according to a current sea state. In another embodiment, the detector threshold is based on a sea noise floor.

Preferably, the range extent filter comprises a K-length averaging filter, connected to receive the binary outputs of said binary detector and having coefficients set to 1/K, wherein K is a positive integer and wherein said filter is convolved across the range cells for each individual pulse of said pulse scan. Preferably, K is a parameter based on a selected balance between probabilities of detection and false alarm. In an important implementation, the K-length averaging filter produces resultant output that is set to either a binary one or zero based on the number of binary ones in a set of K sequential binary outputs input from the binary detector.

Preferably, the persistence integration stage scans each range over L pulses, where L is the number of pulses in a pulse scan, by first stacking the outputs of the range extent filter from all L pulses such that similar ranges are matched up.

The further detector preferably comprises a M-of-N detector.

According to a further aspect of the invention, there is provided a method for detecting slow-moving targets in high resolution clutter, the method comprising the steps of:

using a binary detector to convert high resolution returns, received and processed in response to radar scan of a plurality of pulses by a plurality of range cells, into binary outputs of ones and zeroes based on whether the corresponding return for each range cell exceeds a detector threshold;

using a range extent averaging filter to convert the binary outputs of the binary detector into a corresponding filter output set to either a binary one, or zero, based respectively on the presence, or absence, of a cluster of radar returns that are closely spaced in range so as to thereby indicate the presence of a target;

determining whether the target presence indicating radar returns of step (ii) persist over a predetermined number of said pulses, and producing a corresponding output; and applying a M-of-N detector to the output of step (iii) to detect presence or absence of a target.

As discussed hereinbefore, the method is preferably used to detect slow moving targets in high resolution sea clutter and, in this application, the detector threshold is based on a quiescent sea level. As above, the detector threshold can be varied according to a current sea state or can be based on a sea noise floor.

Preferably, the range extent filter comprises a K-length averaging filter, connected to receive the binary outputs of the binary detector and having coefficients set to 1/K, wherein K is a positive integer, and the range extent filter is convolved across the range cells for each individual pulse of the pulse scan. As discussed above, K is preferably selected based on a balance between probabilities of detection and false alarm. As was also discussed above, the K-length averaging filter preferably produces a resultant output that is set to either a binary one or zero based on the number of binary ones in a set of K sequential binary outputs and thus dependent on the presence, or absence, of said cluster of radar returns that are closely spaced in range.

As was also discussed previously, the persistence integration stage is used to scan each range over L pulses, where L is the number of pulses in a pulse scan, by first stacking the outputs of the range extent filter from all L pulses such that similar ranges are matched up.

In accordance with yet another related aspect of the invention, there is provided an apparatus for detecting slow-moving targets in high resolution clutter, the apparatus comprising:

a binary detector stage for high resolution returns produced in response to a pulse scan of a plurality of pulses, and for converting said returns into corresponding binary outputs of ones and zeroes depending on whether the returns exceed a detector threshold;

a range extent stage for converting the binary outputs into a target range extent output;

a persistence integration stage for receiving the output of said range extent filter, for producing a persistence output based on target range extent persistence over a predetermined time period; and a detector stage for receiving the persistence output and for producing an output indicative of target presence when said persistence output exceeds a selected threshold.

As indicated previously, the apparatus is preferably used to detect slow moving targets in high resolution sea clutter and wherein when so sued, the detector threshold of the binary detector is related to a quiescent sea level.

As set forth hereinabove, in a preferred implementation, the range extent stage comprises a K-length averaging filter, connected to receive said binary outputs of the binary detector and having coefficients set to 1/K, wherein K is a positive integer, the K-length filter being convolved across the range cells for each individual pulse of said pulse scan, and producing an output that is set to either a binary one or zero based on the number of binary ones in a set of K sequential binary outputs received from said binary detection stage.

Further features and advantages of the present invention will be set forth in, or apparent from, the detailed description of preferred embodiments thereof which follows.

DESCRIPTION OF THE PREFERRED EMBODIMENTS

To provide additional background before describing preferred embodiments of the invention, it is noted that for high enough range resolution, even rather small targets tend to extend over a number of range cells. For larger targets, the number of range cells the target extends over can become quite significant. Therefore, target extent can be used to discriminate true targets against sea clutter when the range resolution is high enough. Further, coherent processing is not necessary because the integration gain is now defined as the number of range cells within a local region that exceed some predetermined threshold, thereby defining the detectable extent of the target.

While range extent alone can, in general, achieve fairly good detection performance in high sea states, the range extent approach may suffer from an increase in false alarms. To make the detection more robust, the persistence of the target returns is used in conjunction with the range extent. This is done or a single scan in which, assuming the pulse repetition frequency (PRF) is high enough, the target motion is negligible. Further, the lack of any noticeable motion of the target over the persistence integration time allows one to forego employing the computationally costly Hough transform often used in track-to-detect algorithms to identify traversal paths in range over a number of scans.

Figure 1:
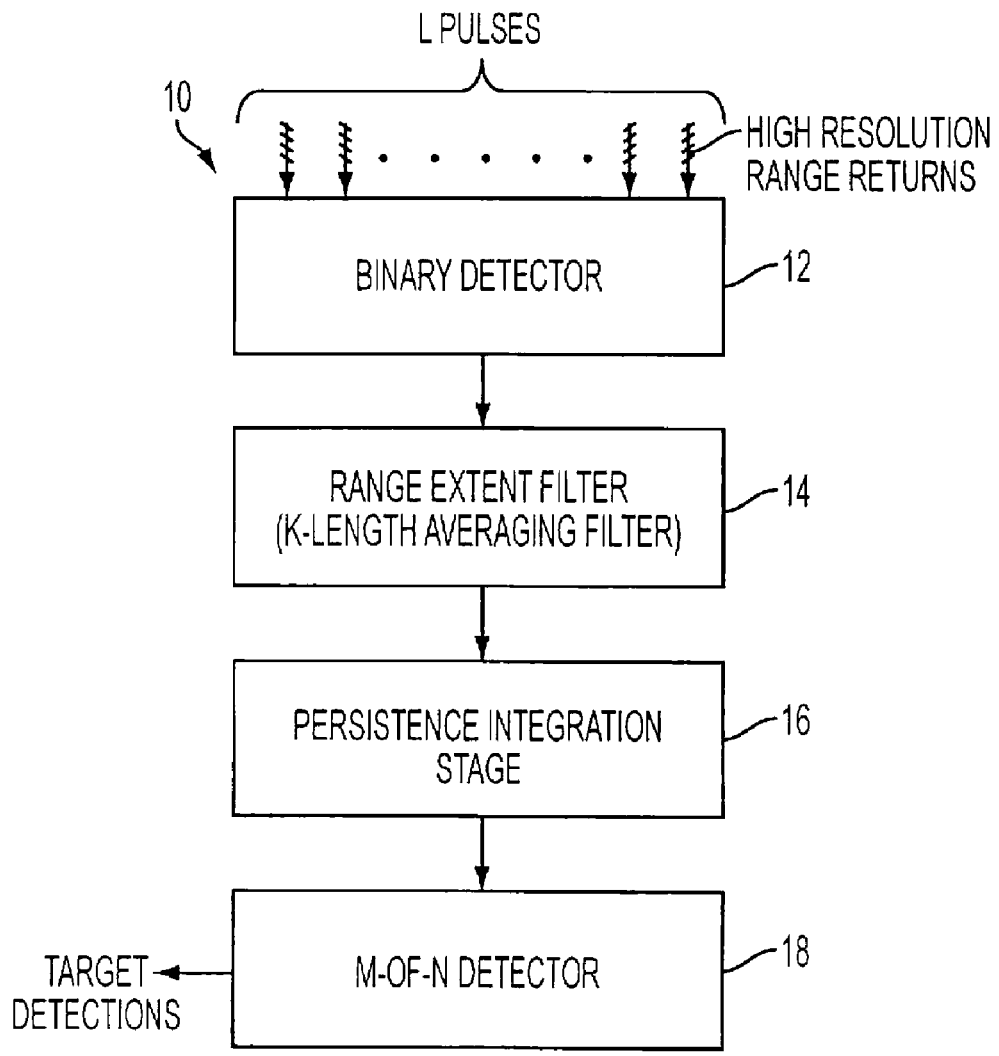
FIG. 1 is a block diagram of a radar detector apparatus for slow moving targets constructed in accordance with a preferred embodiment of the invention.

Referring to FIG. 1, there is shown a detector apparatus or detector 10 constructed in accordance with a preferred embodiment of the invention. In this embodiment, detector 10 is comprised of four stages, as illustrated. The first stage of detector 10 is a simple binary detector 12 in which the detector threshold is set according to the quiescent level of the sea. This level may change according to the current sea state. For high range resolution, sea clutter is not contained in every range cell and is, in fact, found to be relatively sparse. Hence, the quiescent level is dictated simply by the noise floor. Using binary detector 12, range cells with magnitudes exceeding the binary detector threshold are set to 1 while all others are set to 0.

The second stage of detector 10 is a range extent stage 14 preferably in the form of a K-length averaging filter. The coefficients of filter 14 are set to 1/K and filter 14 is convolved across the range cells for each individual pulse in the scan. The resulting filter outputs of filter 14 are set to either 1 or 0, thereby indicating the presence, or not, respectively, of a cluster of closely spaced (in range) radar returns associated with the range extent of a target. Thus, considering a filter 14 wherein K=10, so that the binary outputs of detector 12 are sampled in groups of 10, and considering an example wherein for an individual pulse, seven of the ten binary outputs for the range cells are "ones" and thus the coefficients sum to 0.7, the filter output is rounded to a 1. On the other hand, with the same filter wherein K=10, but considering an example wherein four of the ten binary outputs for the range cells are "ones" and the filter coefficients thus sum to 0.4, the filter output is rounded to a 0. Note that in general 0.5 need not necessarily be the demarcation (as it is when rounding).

The selection of the parameter K is based on acceptable probabilities of detection and false alarm. Smaller values of K provide greater sensitivity to small targets as well as sea clutter thereby resulting in good detection performance but with possible high false alarm rates, depending on the sea state. Conversely, large values of K will only detect large target extents but are very robust with respect to sea clutter. It will be appreciated that calibration and knowledge of the current sea state are needed to properly select K.

The third stage of detector 10 comprises a persistence integration stage 16 and determines the persistence of the target returns over L pulses. This is accomplished by first stacking the range-filtered results from all L pulses such that similar ranges match up. As discussed above, for slow-moving targets, and with a high enough PRF, target motion is negligible. Hence, the output value of the range extent filter 14 at a given range is summed by persistence integration stage 16 over the L pulses to determine the temporal persistence of the target extent.

After stage 16, the detection of a target is then accomplished by a final detector stage 18, which preferably comprises a M-of-N detector. In this embodiment, detection of a target involves applying a simple M-of-N detection scheme to the summation results produced by persistence integration stage 16. Control of the false alarm rate can be achieved by selecting the operating parameters of the detector 18 according to the environment.

Among the advantages thereof, the detector of the invention is robust for very large clutter returns because the first binary detection stage 12 eliminates the magnitude information, and the detector 10 subsequently addresses only range extent and persistence (in stages 14 and 16). For this reason, the detector is capable of detecting small target returns (as long as these returns exceed the noise floor by a predetermined amount) in the presence of very large clutter returns.

To provide a better understanding of the invention, reference will now be made to a non-limiting example. Consider clutter data from the APS-137 X-band radar which possesses 1 foot range resolution. Further, for ranges covering 10,000 feet (roughly 1.9 miles), there are targets inserted at ranges beginning at 2507 ft., 4983 ft., 7410 ft., and 9000 ft., all with a target extent of 25 feet. The target returns are modeled as complex Gaussian with an SNR of 10 dB and glint such that the target returns are a present 75% of the time. The noise is also modeled as complex Gaussian and is set such that the clutter-to-noise (CNR) ratio for the APS-137 data is 40 dB. The scan is comprised of 20 pulses. The first-stage threshold, corresponding to the binary threshold of binary detector stage 12, is set at 7 dB above the noise floor, the target extent filter, corresponding to stage 16, has a length K=10, and the M-of-N detector is set at 10-of-20 detection level to declare a target detection.

Figure 2:
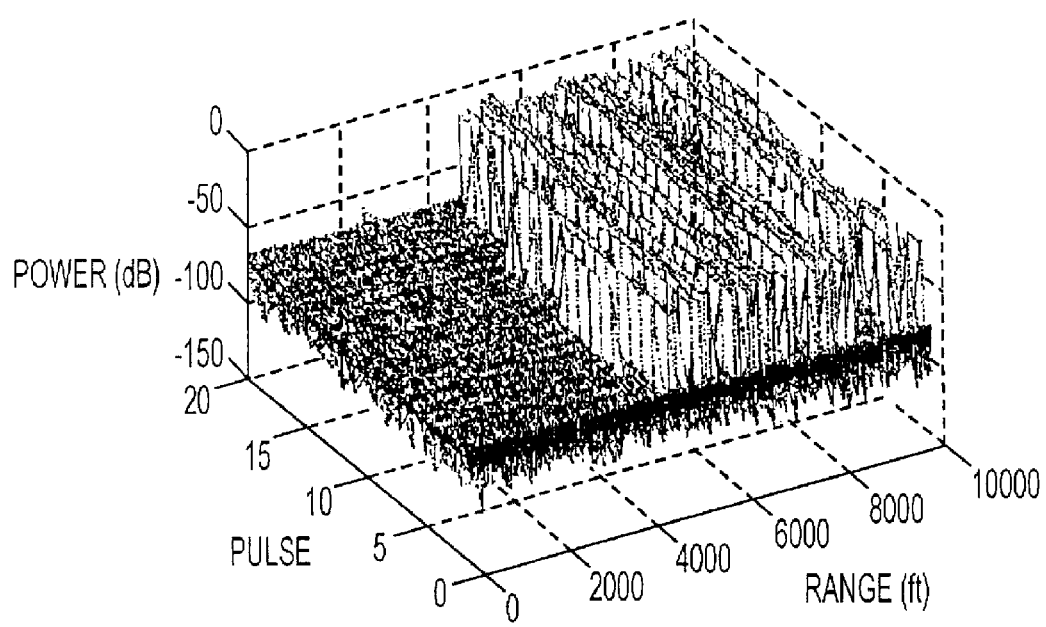
FIG. 2 is a three dimensional plot of the power of radar returns for each pulse of the radar pulse scan and each radar range cell.

Referring to FIG. 2, there is depicted the above-described scenario plotted in terms of range, pulse, and the power of the return signal (in dB). As can be seen in FIG. 2, there is a small target visible across the 20 pulses near range 2500 ft. However, beyond about 4000 ft., large clutter returns are visible due to the presence of cresting waves. These clutter returns completely hide any nearby targets.

After applying the initial binary detector 12, a number of binary returns (binary "ones") are produced that could potentially be targets, and it is to the binary returns that the range extent filter 14 is applied.

Applying the K=10 range extent filter 14 and then rounding the result to either 1 or 0 as described above, results in a plot of pulse versus range cell wherein a large portion of the clutter is removed because the clutter does not possess sufficient range extent.

Figure 3:
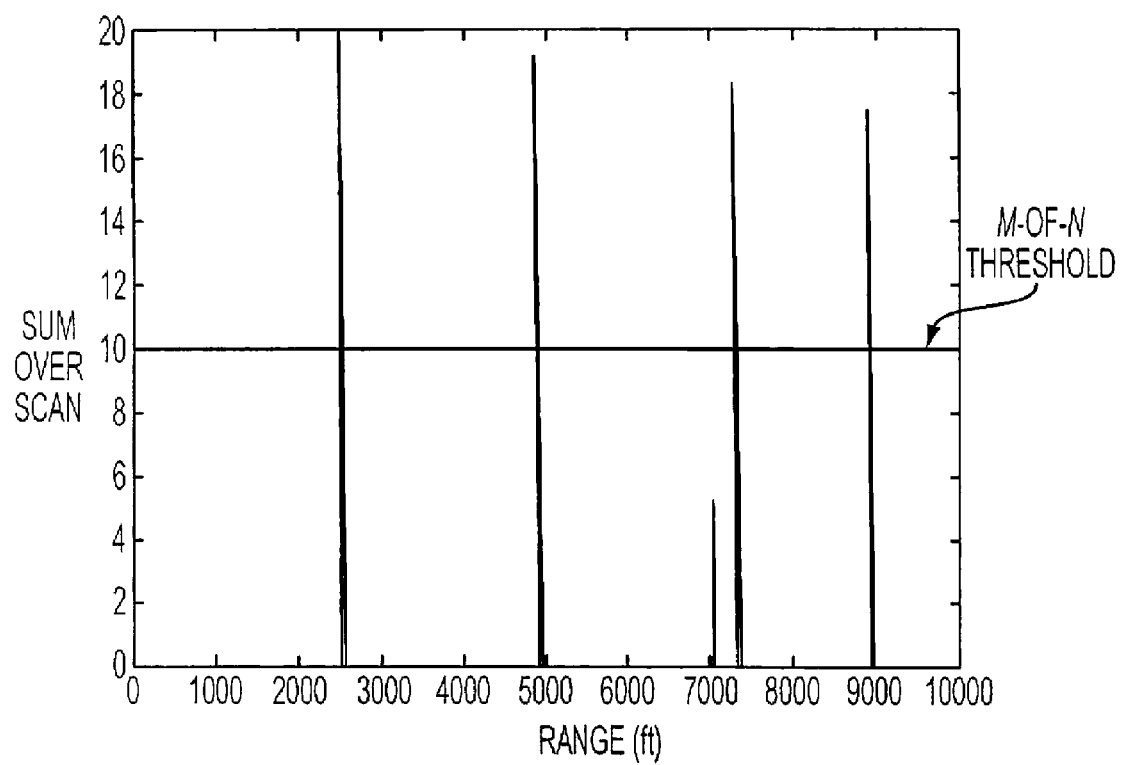
FIG. 3 is a plot of the output of the persistence integration stage of FIG. 1 as a function of range, illustrating the operation of the fourth, detector stage of FIG. 1.

Referring to FIG. 3, the results are shown after employing persistence integration (stage 16) after the 20 pulses specified in this example. As illustrated, all four of the 10 dB targets are easily detected by the final M-of-N (10-of 20) detector stage 18, even though some of these were completely buried in 40 dB clutter.

Although the invention has been described above in relation to preferred embodiments thereof, it will be understood by those skilled in the art that variations and modifications can be effected in these preferred embodiments without departing from the scope and spirit of the invention.

What is claimed:

1. An apparatus for detecting slow-moving targets in high resolution clutter, said apparatus comprising:
   a binary detector for converting high resolution returns produced and processed in response to a pulse scan of a plurality of identical pulses, by a plurality of range cells, into corresponding binary outputs based on a comparison of range cell magnitudes with a binary detector threshold;
   a range extent filter for converting the binary outputs into a target range extent output indicating presence of a cluster of said high resolution returns that are closely spaced in range;
   a persistence integration stage for receiving the output of said range extent filter, for determining target range extent persistence over a predetermined time period, and for producing a persistence output; and
   a further detector for receiving the persistence output of said persistence integration stage and for declaring detection of a target based on a comparison of the persistence output with a predetermined threshold.

2. An apparatus according to claim 1 wherein the apparatus is used to detect slow moving targets in high resolution sea clutter and wherein said detector threshold of said binary detector is related to a quiescent sea level.

3. An apparatus according to claim 2 wherein said detector threshold is variable according to a current sea state.

4. An apparatus according to claim 2 wherein said detector threshold is based on a sea noise floor.

5. An apparatus according to claim 1 wherein said range extent filter comprises a K-length averaging filter, connected to receive the binary outputs of said binary detector and having coefficients set to 1/K, wherein K is a positive integer and wherein said filter is convolved across the range cells for each individual pulse of said pulse scan.

6. An apparatus according to claim 5 wherein K is a parameter based on a selected balance between probabilities of detection and false alarm.

7. An apparatus according to claim 5 wherein the K-length averaging filter produces resultant output that is set to either a binary one or zero based on the number of binary ones in a set of K sequential binary outputs input from said binary detector.

8. An apparatus according to claim 1 wherein said persistence integration stage scans each range over L pulses, where L is the number of pulses in a pulse scan, by first stacking the outputs of the range extent filter from all L pulses such that similar ranges are matched up.

9. An apparatus according to claim 1 wherein said further detector comprises a M-of-N detector.

10. A method for detecting slow-moving targets in high resolution clutter, said method comprising the steps of:
   (i) using a binary detector to convert high resolution returns, received and processed in response to radar scan of a plurality of pulses by a plurality of range cells, into binary outputs of ones and zeroes based on whether the corresponding return for each range cell exceeds a detector threshold;
   (ii) using a range extent averaging filter to convert the binary outputs of the binary detector into a corresponding filter output set to either a binary one, or zero, based respectively on the presence, or absence, of a cluster of radar returns that are closely spaced in range so as to thereby indicate the presence of a target;

(iii) determining whether the target presence indicating radar returns of step (ii) persist over a predetermined number of said pulses, and producing a corresponding output; and (iv) applying a M-of-N detector to the output of step (iii) to detect presence or absence of a target.

11. A method according to claim 10 wherein the method is used to detect slow moving targets in high resolution sea clutter and wherein the detector threshold is based on a quiescent sea level.

12. A method according to claim 11 wherein the detector threshold is varied according to a current sea state.

13. A method according to claim 11 wherein the detector threshold is set based on a sea noise floor.

14. A method according to claim 10 wherein the range extent filter comprises a K-length averaging filter, connected to receive the binary outputs of said binary detector and having coefficients set to 1/K, wherein K is a positive integer and wherein the range extent filter is convolved across the range cells for each individual pulse of said pulse scan.

15. A method according to claim 14 wherein K is selected based on a balance between probabilities of detection and false alarm.

16. A method according to claim 14 wherein the K-length averaging filter produces a resultant output and said resultant output is set to either a binary one or zero based on the number of binary ones in a set of K sequential binary outputs and dependent on the presence, or absence, of said cluster of radar returns that are closely spaced in range.

17. A method according to claim 10 wherein said persistence integration stage is used to scan each range over L pulses, where L is the number of pulses in a pulse scan, by first stacking the outputs of the range extent filter from all L pulses such that similar ranges are matched up.

18. An apparatus for detecting slow-moving targets in high resolution clutter, said apparatus comprising:

a binary detector stage for high resolution returns produced in response to a pulse scan of a plurality of pulses, and for converting said returns into corresponding binary outputs of ones and zeroes depending on whether the returns exceed a detector threshold;

a range extent stage for converting the binary outputs into a target range extent output;

a persistence integration stage for receiving the output of said range extent stage, for producing a persistence output based on target range extent persistence over a predetermined time period; and a detector stage for receiving the persistence output and for producing an output indicative of target presence when said persistence output exceeds a selected threshold.

19. An apparatus according to claim 18 wherein the apparatus is used to detect slow moving targets in high resolution sea clutter and wherein said detector threshold of said binary detector is related to a quiescent sea level.

20. An apparatus according to claim 18 wherein said range extent stage comprises a K-length averaging filter, connected to receive said binary outputs of said binary detector and having coefficients set to 1/K, wherein K is a positive integer, said K-length filter being convolved across the range cells for each individual pulse of said pulse scan, and producing an output that is set to either a binary one or zero based on the number of binary ones in a set of K sequential binary outputs received from said binary detection stage.

* * * * *